(12) United States Patent
Hannon

(10) Patent No.: US 8,436,724 B2
(45) Date of Patent: May 7, 2013

(54) METHOD AND APPARATUS FOR DETERMINING TIRE CONDITION AND LOCATION

(75) Inventor: Timothy Michael Hannon, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 375 days.

(21) Appl. No.: 12/940,574

(22) Filed: Nov. 5, 2010

(65) Prior Publication Data

US 2012/0112899 A1     May 10, 2012

(51) Int. Cl.
*B60C 23/10*     (2006.01)

(52) U.S. Cl.
USPC ........................................................ 340/445

(58) Field of Classification Search ............ 340/445, 340/442, 426.33, 447, 449; 701/49; 157/1
See application file for complete search history.

(56) References Cited

U.S. PATENT DOCUMENTS

| | | | |
|---|---|---|---|
| 4,567,460 A | 1/1986 | Gebler | |
| 5,808,190 A | 9/1998 | Ernst | |
| 6,112,587 A | 9/2000 | Oldenettel | |
| 6,731,205 B2 | 5/2004 | Schofield et al. | |
| 6,922,140 B2 | 7/2005 | Hernando et al. | |
| 7,237,433 B2 | 7/2007 | Walenty et al. | |
| 7,336,161 B2* | 2/2008 | Walraet | 340/442 |
| 2004/0066290 A1* | 4/2004 | Hernando et al. | 340/447 |
| 2006/0179930 A1 | 8/2006 | Lin | |
| 2009/0204361 A1 | 8/2009 | Watasue | |
| 2010/0013618 A1* | 1/2010 | Patel et al. | 340/447 |
| 2010/0134269 A1* | 6/2010 | Zhu et al. | 340/447 |
| 2012/0059551 A1* | 3/2012 | Juzswik et al. | 701/49 |

FOREIGN PATENT DOCUMENTS

| | | |
|---|---|---|
| EP | 0 806 306 A2 | 11/1997 |
| EP | 0 997 326 A2 | 5/2000 |
| FR | 2 879 750 A1 | 6/2006 |
| JP | 2010-122023 | 6/2010 |

OTHER PUBLICATIONS

A U.S. Juzswik et al. U.S. Appl. No. 12/876,756, filed Sep. 7, 2010 entitled "Method and Apparatus for Determining Tire Position on a Vehicle".
A European Search Report dated Feb. 2, 2012 as received for European Patent Appln. No. EP 1100 8759, filed Nov. 3, 2011 (2 pgs.).

* cited by examiner

*Primary Examiner* — Phung Nguyen
(74) *Attorney, Agent, or Firm* — Tarolli, Sundheim, Covell & Tummino LLP

(57) ABSTRACT

An apparatus (10) determines a tire condition and location on a vehicle (12) including a tire-based sensing unit (14) including, a first tire rotation sensor (66) for providing a first tire rotation signal (80) each time the tire passes one of at least two predetermined rotational positions and an unique tire identification indicator, a transmitter (86) and a controller for controlling the transmitter so that the transmission occurs when the first tire rotation signal indicates the tire has reached one of the at least two predetermined rotational positions. The apparatus further includes a second tire rotation sensor (22) mounted external of the tire for sensing tire rotation and for providing a second tire rotation signal indicative of incremental angular position of the tire relative to a reference. A vehicle-based receiver (44) correlates reception with a particular tire location on the vehicle.

14 Claims, 5 Drawing Sheets

METHOD AND APPARATUS FOR DETERMINING TIRE CONDITION AND LOCATION

TECHNICAL FIELD

The present invention relates to a method and apparatus for determining a tire condition and location on a vehicle in a tire pressure monitoring system.

BACKGROUND

Systems for sensing tire conditions and displaying sensed tire condition information to a vehicle occupant are known. Often, such systems are known as tire pressure monitoring ("TPM") systems even though the system may sense tire conditions in addition to pressure, such as tire temperature. Such TPM systems include a tire-based sensor assembly that senses, for example, the air pressure and temperature inside its associated tire and transmits the sensed tire condition information to a vehicle-based receiver, i.e., a receiver mounted in the vehicle. The transmitted sensed tire condition signal may be a coded radio frequency ("RF") signal. The vehicle-based receiver is connected to a display located in the vehicle cabin so as to display, for example, a warning signal to the vehicle operator when an under-inflated tire pressure condition exists or an over-heated tire condition occurs.

Each tire-based sensor assembly may have a unique identification ("ID") code associate therewith. The tire-based sensor assembly may transmit a signal that includes its associated unique ID code along with the sensed tire condition. The vehicle-based receiver can associate the received tire signal and unique ID with a particular tire location on the vehicle such as front right ("FR"), front left ("FL"), rear right ("RR"), or rear left ("RL"). By associating the tire ID with the tire location on the vehicle, the vehicle-based receiver is able to display the sensed tire condition information at each particular tire location so the vehicle operator can identify which tire (i.e., tire location) has a sensed, improper condition.

Associating a tire location with a tire-based transmitted ID code for each of the tire locations requires a "learning" process by the vehicle-based receiver. Methods have been proposed to accomplish this learning function including using signal interrogation in which each tire-based sensor assembly includes a receiver that is separately interrogated from a transmitter located outside of the tire using, for example, a low frequency ("LF") interrogation signal. In response to receiving an interrogation signal, the tire-based sensor assembly transmits a response signal having its unique ID. Upon receipt of the response signal, the vehicle-based receiver associates that unique tire ID with that tire location since the system "knows" which tire location was just interrogated. The vehicle-based system stores tire-based sensor IDs and tire location associations in memory for later use in its display operation.

Some TPM systems have been proposed in which the tire-based system includes a tire rotation sensor. The tire-based system transmits a tire ID, tire rotation values, and tire condition information. Each tire has an associated external wheel rotation sensor that monitors wheel rotation and determines second rotation values for each wheel. A controller associates tire location by comparing, with sufficient coincidence, the tire-based rotation values with the externally monitored rotation values to establish tire location allocation. These arrangements, however, require that each transmitted tire-based signal include tire rotation values along with the tire condition values. The transmission of the tire rotation values each transmission of tire condition information results in wasted energy of the tire-based sensor which may be powered by a battery since the transmitted RF signal has to have at least two information portions, i.e., tire rotation information and tire condition information, for location allocation.

SUMMARY OF THE INVENTION

The present invention is directed to a method and apparatus for determining a tire condition and location on a vehicle.

In accordance with an example embodiment of the present invention, an apparatus determines a tire condition and location on a vehicle including a tire-based sensing unit, a plurality of tires on the vehicle having an associated tire-based sensing unit, each tire-based sensing unit including a first tire rotation sensor mounted for rotation with the tire and for providing a first tire rotation signal each time the tire passes one of at least two predetermined rotational positions during tire rotation, a tire condition sensor for sensing a tire condition and for providing a tire condition signal indicative thereof, and an unique tire identification indicator, a transmitter for transmitting the tire condition signal and the unique tire identification indicator, a controller for controlling the transmitter so that the transmission of the tire condition signal and the unique tire identification indicator occurs when the first tire rotation signal indicates the tire has reached one of the at least two predetermined rotational positions during tire rotation. The apparatus further includes a second tire rotation sensor mounted external of the tire for sensing tire rotation and for providing a second tire rotation signal indicative of incremental angular positions of the tire relative to a reference. A vehicle-based receiver receives the transmitted tire condition signal, the unique tire identification indicator, and the second tire rotation signal and correlates reception of the tire condition signal with the second tire rotation signal so as to associate the unique tire identification indicator with a particular tire location on the vehicle.

In accordance with another example embodiment of the present invention, a method for determining a tire condition and location on a vehicle comprises the steps of sensing tire rotation and providing a first tire rotation signal each time the tire passes one of at least two predetermined rotational positions during tire rotation, sensing a tire condition and for providing a tire condition signal indicative thereof, transmitting the tire condition signal and a unique tire identification indicator when said first tire rotation signal indicates the tire has reached one of said at least two predetermined rotational positions during the tire rotation, sensing tire rotation relative to the vehicle and providing a second tire rotation signal indicative of incremental angular positions of the tire relative to a reference, receiving said transmitted tire condition signal, the unique tire identification indicator, and said second tire rotation signal, and correlating reception of said tire condition signal with said second tire rotation signal so as to associate the unique tire identification indicator with a particular tire location on the vehicle.

BRIEF DESCRIPTION OF THE DRAWINGS

The foregoing and other features and advantages of the present invention will become apparent to one skilled in the art upon consideration of the following detailed description of the invention along with the accompanying drawings, in which.

DETAILED DESCRIPTION

Figure 1:
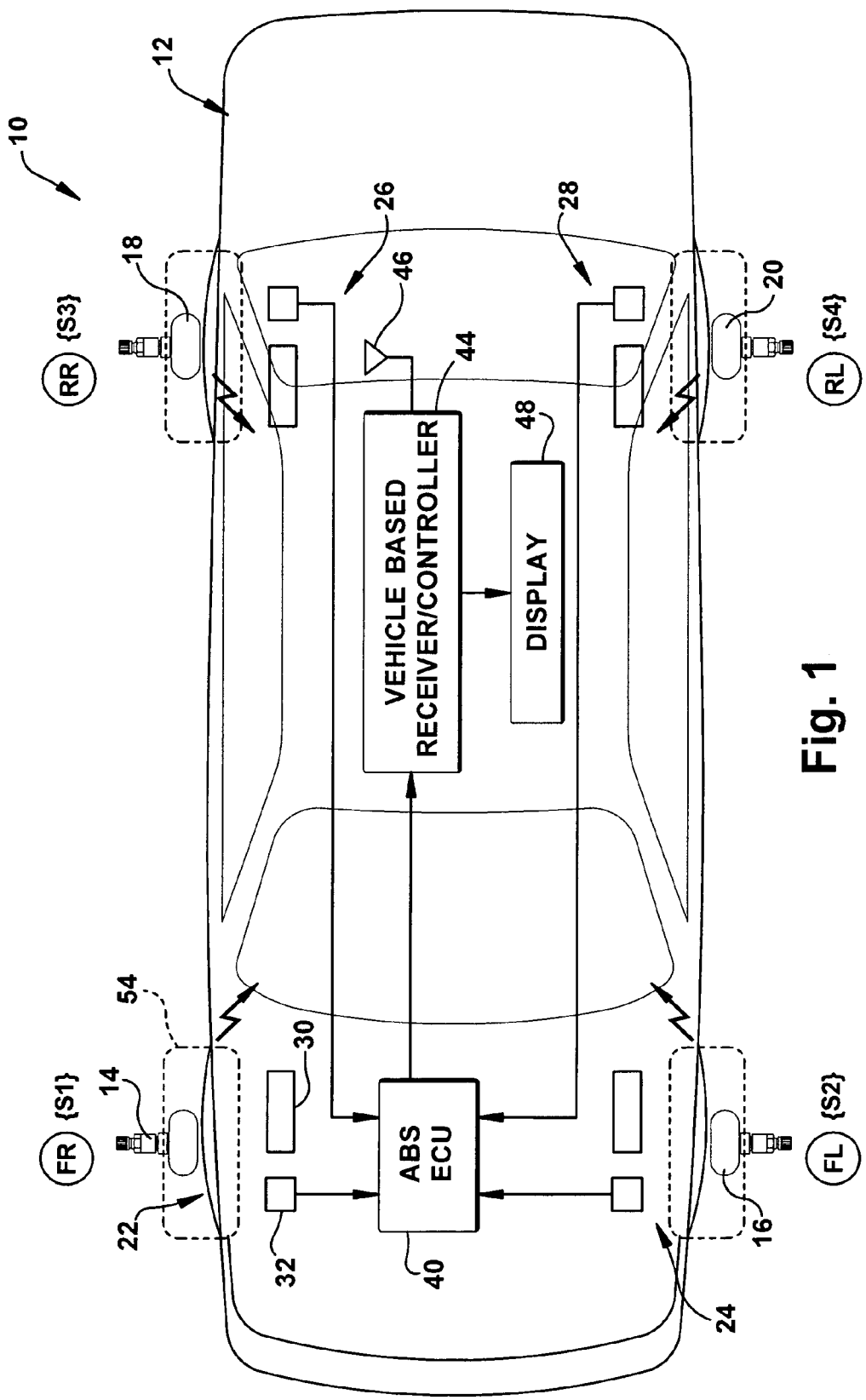
FIG. 1 is a schematic illustration of a vehicle having a tire pressure monitoring system in accordance with an example embodiment of the present invention.

Referring to FIG. 1, a tire pressure monitoring ("TPM") system 10, made in accordance with an example embodiment of the present invention, is shown mounted on a vehicle 12. The TPM system 10 includes a plurality of sensors 14 ("S1"), 16 ("S2"), 18 ("S3"), and 20 ("S4") located at each of the four corners front right ("FR"), front left ("FL"), rear right ("RR"), and rear left ("RL"), respectively, of the vehicle 12. It should be understood that the sensors 14, 16, 18, and 20 are mounted in their associated tires in any of several known arrangements. For example, each of the TPM sensors can be mounted as part of the valve stem assembly, can be mounted in a separate housing and attached to the wheel rim, or to the side of the tire itself. Each of the sensors 14, 16, 18, and 20 include a sensor for sensing at least two predetermined angular positions of the tire during tire rotation and a sensor for sensing at least one condition of the tire, such as pressure and/or temperature. The sensors 14, 16, 18, and 20 further include a transmitter, such as a radio frequency ("RF") transmitter, for transmitting the sensed tire condition information.

The TPM system 10 further includes wheel rotation sensor assemblies 22, 24, 26, and 28 located at associate FR, FL, RR, and RL corners of the vehicle, respectively, and mounted external of the associated tire at that vehicle corner location. Each external wheel rotation sensor assembly 22 includes a circular toothed plate or disc 30 that is mounted so as to rotate with its associated tire. A sensor 32 senses passing of each tooth of the disc 30 passed the sensor as the tire rotates and provides an electrical signal indicative thereof. The wheel rotation sensor assemblies 22, 24, 26, 28 may be part of the vehicle's anti-lock braking system ("ABS") and may be referred to as wheel speed ("WS") sensors. Each sensor 32 of the wheel rotation sensor assemblies is connected to an ABS electronic control unit ("ECU") 40.

The TPM system 10 further includes a vehicle-based receiver/controller 44. The receiver/controller 44 is connected to the ABS ECU and receives wheel rotation signals indicative of the incremental angular position of each of the wheels at the four corners of the vehicle via the sensor 32 and the toothed disc 30. The receiver/controller 44 also includes a receiving antenna 46 for receiving RF signals indicative of tire condition information from each of the tire sensors 14, 16, 18, and 20. The receiver/controller 44 is connected to a display 48 for displaying tire condition information for each of the tires at each of the vehicle corners. The display 48 can take any of several known forms including a liquid crystal display ("LCD").

Figure 2:
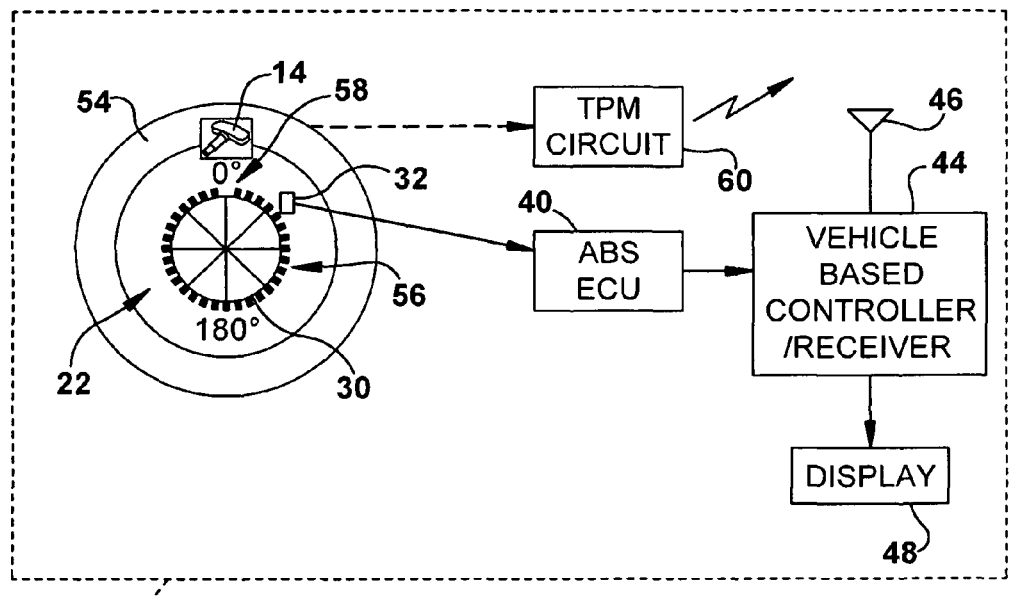
FIG. 2 is a schematic block diagram of the tire pressure monitoring system of FIG. 1 showing the sensor arrangement associated with one of the tires in greater detail.

Referring to FIG. 2, a tire 54 located at the FR corner of the vehicle includes the TPM sensor 14 operatively mounted to the tire 54 for sensing tire rotation and tire condition. The wheel rotation sensor 22 has its toothed disc 30 mounted so as to rotate with the tire 54. The sensor 32 provides an electrical signal indicative of each tooth of disc 30 passing by the sensor 32. In accordance with one example embodiment of the present invention, the toothed disc has seventy two teeth 56 equally spaced about the disc 30 with one tooth missing (total of seventy one teeth). Each time a tooth passes the sensor 32 a pulse is provided. Any of several types of sensors could be used for sensor 32 including an inductive sensor, a Hall Effect sensor, etc. If there are seventy two teeth locations, a pulse is output from the sensor 32 every five degrees except when the missing tooth location 58 is encountered. The missing tooth location 58 is designated as the zero wheel position and can function as a reference point.

The output from the sensor 32 is connected to the ABS controller 40. The ABS controller monitors the output of the sensor and determines the angular position of the disc 30, and, in turn, the angular position of the wheel 54, relative to the zero wheel disc position, i.e., when the space 58 passes the sensor 32. It should be appreciated that, although no signal is generated as the space 58 on the disc 30 passes the sensor 32, the ABS ECU receives a continuous stream of pulses when the tire 54 is continuously rotating during normal vehicle movement and when there is a missing pulse, the ABS ECU "knows" that half way between the last pulse and the next received pulse is the "zero position." The ABS ECU then knows that each pulse received after the zero position is equal to five degrees of rotation. The angle monitoring/determination continuous as the disc 30 and wheel 54 rotate with the zero position restarting the angle determination each complete revolution. The ABS ECU is connected to the vehicle-based TPM receiver/controller 44.

Figure 3:
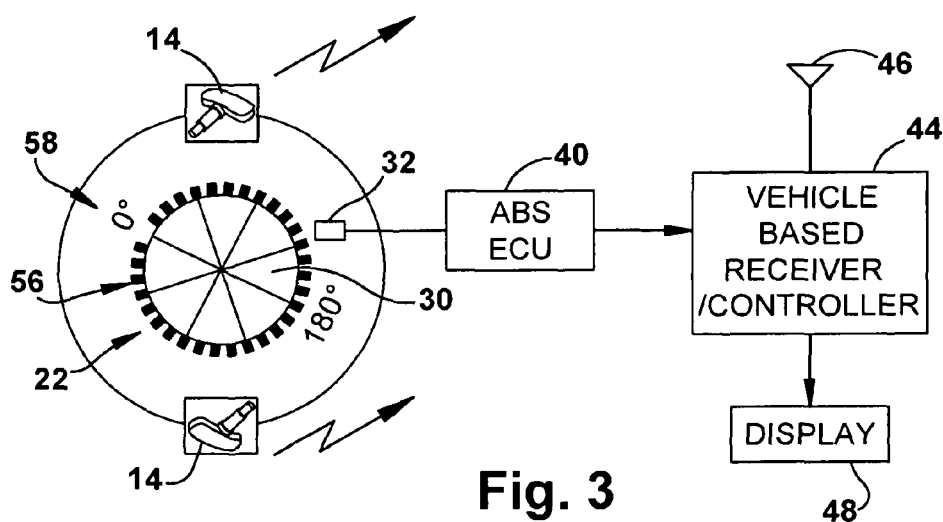
FIG. 3 is a schematic illustration of the tire pressure monitoring system of FIG. 2 showing the tire-based sensor at two rotational positions where signal transmission could occur.

The tire-based sensor 14 includes a TPM circuit 64 that includes the tire condition sensor and a tire rotation sensor that senses at least two predetermined angular positions of the tire 54 as it rotates. As shown in FIG. 3, an example embodiment of the present invention is shown in which the tire-based sensor 14 can transmit its tire condition RF signal at two separated angular positions of the tire 54 as the tire rotates during normal vehicle movement, e.g., not parked but moving. By providing for transmission at two spaced-apart angles, an RF-null position occurrence is avoided.

Figure 4:
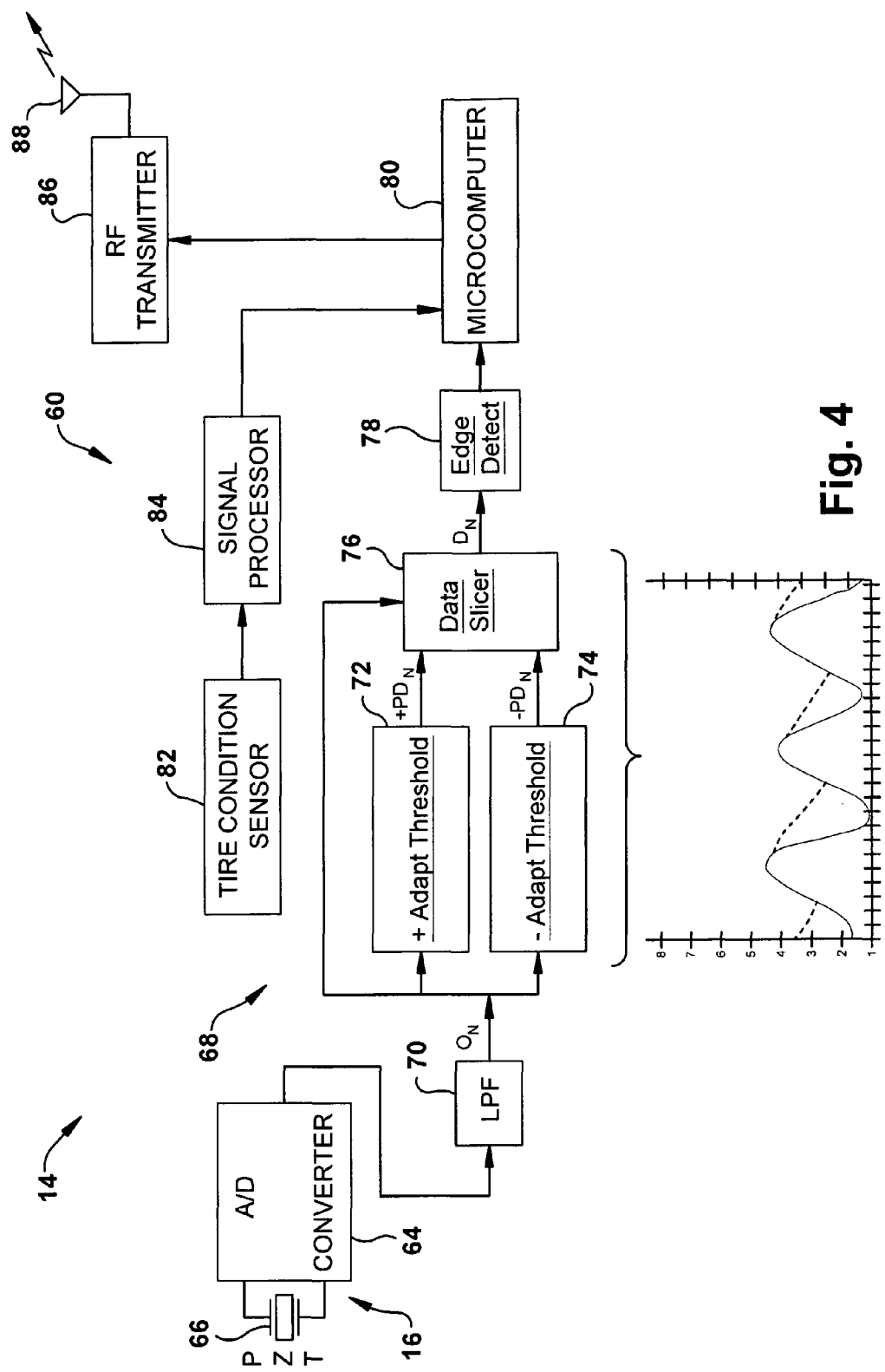
FIG. 4 is a schematic block diagram of the tire-based sensor unit in accordance with an example embodiment of the present invention.

Referring to FIG. 4, the tire-based sensor 14 includes a circuit 60. Those skilled in the art will appreciate that the control functions of the circuit 60 could be accomplished using a controller, such as a microcontroller, by using discrete circuitry, a combination of different types of circuitry, or an application specific integrated circuit ("ASIC") and can be embodied in either the analog or digital domain. Each of the tire-based sensors 14, 16, 18, 20 is constructed and operates in a similar manner.

An accelerometer 66 may be a piezoelectric transducer ("PZT"). The accelerometer 66 provides or generates a voltage that changes with force as the tire 54 rotates. Two forces that the accelerometer 66 experiences during tire rotation is centripetal force and earth's gravitational force. As the accelerometer 66 travels in a circle during one tire rotation, it will experience the earth's gravitation force change from +1G to −1G in a sinusoidal pattern over one rotation of the tire. The centripetal force will either be of a consistent level when the vehicle is traveling at a constant velocity, or will be slowly changing with vehicle speed, in comparison to the change in the earth's gravitational force during rotation.

The accelerometer sensor 66 is connected to an Analog-to-Digital Converter ("ADC") 64. The output of the ADC, representing the sampled acceleration signal, is connected to a low pass filter ("LPF") 70 that can be embodied as hardware or the function accomplished in software. The LPF 70 aids in removing road noise from the accelerometer signal. The output of the LPF 70 is compared against a plus threshold value in comparator 72 and a minus threshold value in comparator 74 and provides a signal reference level for use in a data slicer 76. The data slicer 76 converts the analog signal into a digital signal (0 or 1). Edge detector circuit 78 detects the rising and falling edge of the signal output from the accelerometer 66 so as to indicate a first predetermined angular position (a 0 value) and a second predetermined angular position (a 1 value) of the tire as the tire rotates. The signal processing of the acceleration signal is such that the 0 and 1 value that occurs at the first and second predetermined angular positions occur as angular position on the tire that are approximately 180 degrees apart. The output of the edge detector is connected to a microcomputer 80. The LPF 70, threshold comparators 72, 74, data slicer 76, and edge detector function 78 could be embodied in software within the microcomputer 80.

The tire-based sensor 14 further includes a tire condition sensor 82 for sensing tire pressure and/or tire temperature. The output of the tire condition sensor 82 is connected to a signal processor circuit 84 that converts the signal from the sensor 82 into a digital format and places the information into a digital packet or word for ultimate transmission having information regarding the sensed tire condition. The output of the signal processor 84 is connected to the microcomputer 80.

The microcomputer 80 has stored in its internal memory its associated, unique ID, e.g., sensor ID=S1 in this example. As mentioned, each tire has its associated unique tire ID. The microcomputer 80 assembles the digital information packet or word for transmission that includes the sensed tire condition and the associated ID. The microcomputer could include other data as part of the information packet if desired such as a wake-up portion, a check-sum portion, etc. The microcomputer, however, does not include as part of the information packet any angle information from the sensor 66. The output of the microcomputer 80 is connected to an RF transmitter circuit 86 for transmission of the information packet having the tire condition information via antenna 88.

The microcomputer 80 includes internal timers that control sample timing (monitoring timing of the sensor 66 and the tire condition sensor 82) and controls transmission rate of information packets from the transmitter 86. In one embodiment of the invention, the sensor 66 and tire condition sensor 82 could always be monitored and tire condition information transmitted each time the edge detector 78 indicates a 0 or 180 degree tire position has been reached during tire rotation. Such continuous sensing and transmission of data is not necessary. Also, Federal transmission guidelines (Federal Communications Commission) must be followed that, at the present, would not permit excessive data transmission.

Figure 5:
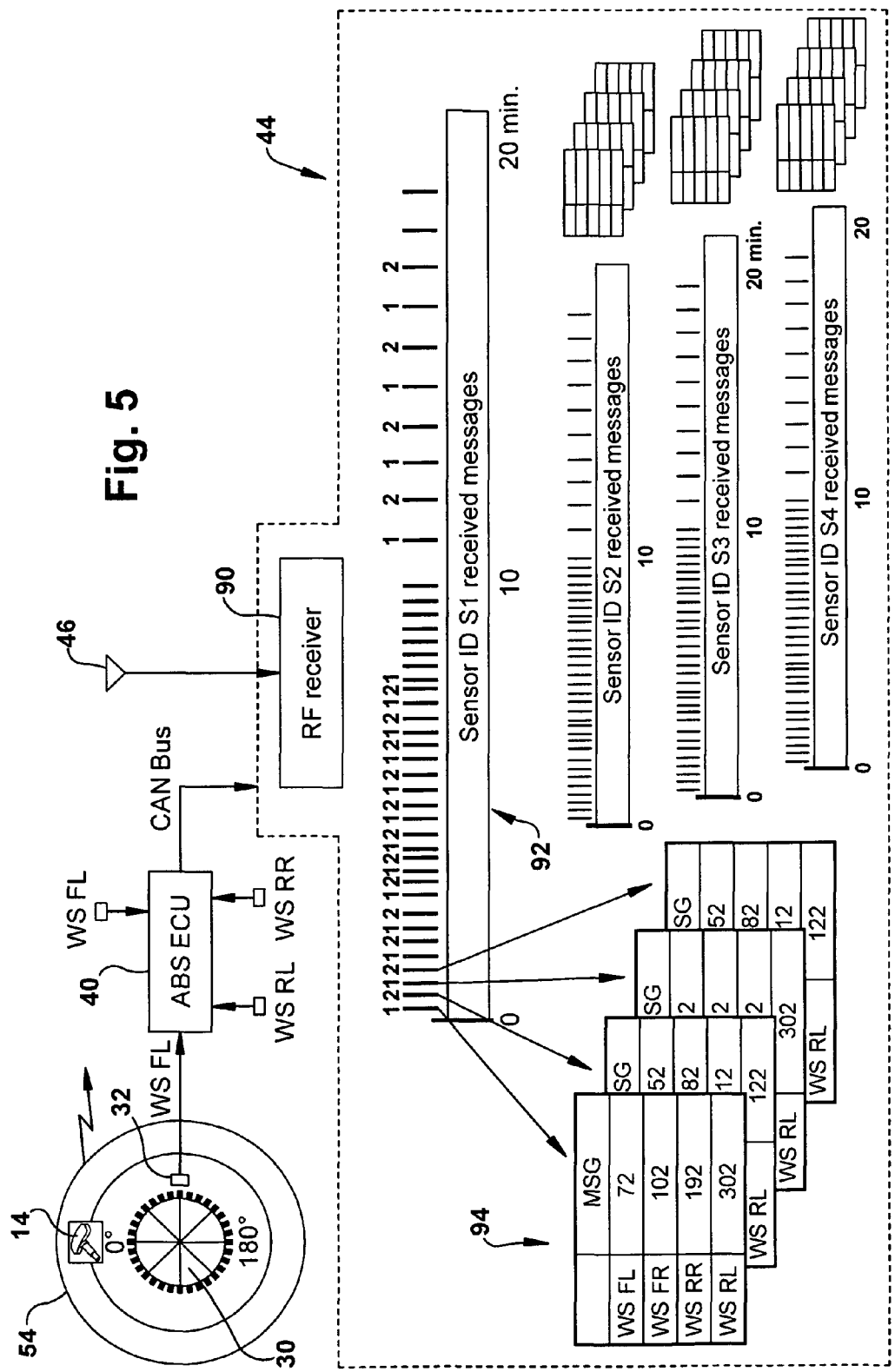
FIG. 5 is a functional block diagram of the tire pressure monitoring system of FIG. 1 showing the vehicle-based receiver in further detail in accordance with an example embodiment of the present invention.

Referring to FIG. 5, the operation of the vehicle-based receiver will be appreciated as well as the transmission control followed by the tire-based sensor 14. The vehicle-based receiver/controller 44 is connected to the output of the ABS ECU 40 via an appropriate connection such as the vehicle's controller-area network bus ("CAN-bus"). The vehicle-based receiver/controller 44 monitors the angular position of each of the wheels of the vehicle via the sensor 32 and toothed disc 30 associated with each wheel, i.e., monitors each of the wheel speed sensors 22, 24, 26, 28 also designated as WS FR, WS FL, WS RR, and WS RL, respectively. The vehicle-based unit 44 also includes an RF receiver 90 connected to the antenna 46 for receiving and demodulating the tire condition information from each of the transmitters associated with the tire-based sensors 14, 16, 18, and 20.

The received signals from each of the tire-based units is referred to herein as message 1 when the wheel or tire rotation is at the first position and message 2 when the wheel or tire rotation is at the second position, which is approximately 180 degrees from the first position, as sensed by the sensor 66.

An event graph 92 represents the occurrence of received tire condition signals from one of the tire-based unit 14 ID S1. When each tire condition signal is received, the receiver/controller 44 monitors the angular position of each of the four wheels as indicated by each associated ABS wheel speed sensor 22, 24, 26, and 28. The tables 94 are the angle values in degrees for the four wheels as detected by the ABS wheel speed sensor each time an RF tire condition message is received. These angular values are stored in memory as the angle values that occurred when a message was received having a tire ID=S1. Similarly, the wheel positions are stored for each of the tire-based units S2, S3 and S4 each time an RF signal from one of their associated tire condition sensors is received.

The transmission of the signals from each tire based unit, as mentioned, is controlled by the sensor's microcomputer 80. The microcontroller 80 "knows" when tire rotation is occurring from the signal 60 from the sensor 66. During a first ten minute period after initial tire rotation begins, it may be desirable to transmit a tire condition signal forty times. During forty predetermined time slots over the ten minute period, the microcontroller 80 monitors the tire condition sensor 82 and transmits a tire condition signal when the edge detector indicates the tire has reached the 0 or 180 degree position. The microcomputer can transmit the tire condition signal in any of several patterns in response to the 0 and 180 degree positions being reached during tire rotation. For example, the microcomputer can transmit at a first of the forty time slots when the tire position reaches position 1. During the second of the forty time slots, the microcontroller could wait and transmit when the tire position reaches position 2, and so on. The result would be tables 94 having a tire transmission pattern of 1, 2, 1, 2, etc. Any other desired pattern could be used by the microcomputer 80. After a first 10 minute time interval of forty transmissions, the microcontroller could change the transmission timing to one time every minute. Also, the microcontroller can either maintain the same transmission pattern or could change the transmission pattern.

The receiver/controller 44, after a sufficient amount of data is collected (sufficient numbers of tables 94 are filled), determines which tire angular positions correlate the best with having received tire condition signals that would have occurred at 0 and 180 degree positions. Assume that the microcontroller 80 was controlling the transmitter 86 to transmit in a 1, 2, 1, 2, pattern. Also assume that the table 94 indicates that that the FR ABS wheel speed sensor (WS FR) always measured angles 102 and 282 degrees, respectively, each time a tire condition signal had a S1 ID. Then, the receiver could assume that the tire ID S1 is located at the FR corner of the vehicle. Once tire condition data correlates with tire angular position with a confidence level above a predetermined threshold, that tire ID for that tire location is stored in an internal memory of the receiver/controller 44 for later use in identifying the tire location when tire condition information is to be displayed on the display 48, e.g., an under inflated tire occurrence. The confidence level can be determined by several different methods. One example is to determine that the WS angle data in a table does not vary over a predetermined number of samples by more than a predetermined amount.

Once the sensor ID's are correlated with the corner locations, the pressure/temperature information portion of the transmitted signal is monitored for each of the sensors, and the tire condition information can be displayed along with the associated determined tire location information for the vehicle operator. As those skilled in the art will appreciate, the display of tire condition information can be limited only to abnormal tire conditions or can be continuous tire pressure and temperature information if so desired.

Figure 6:
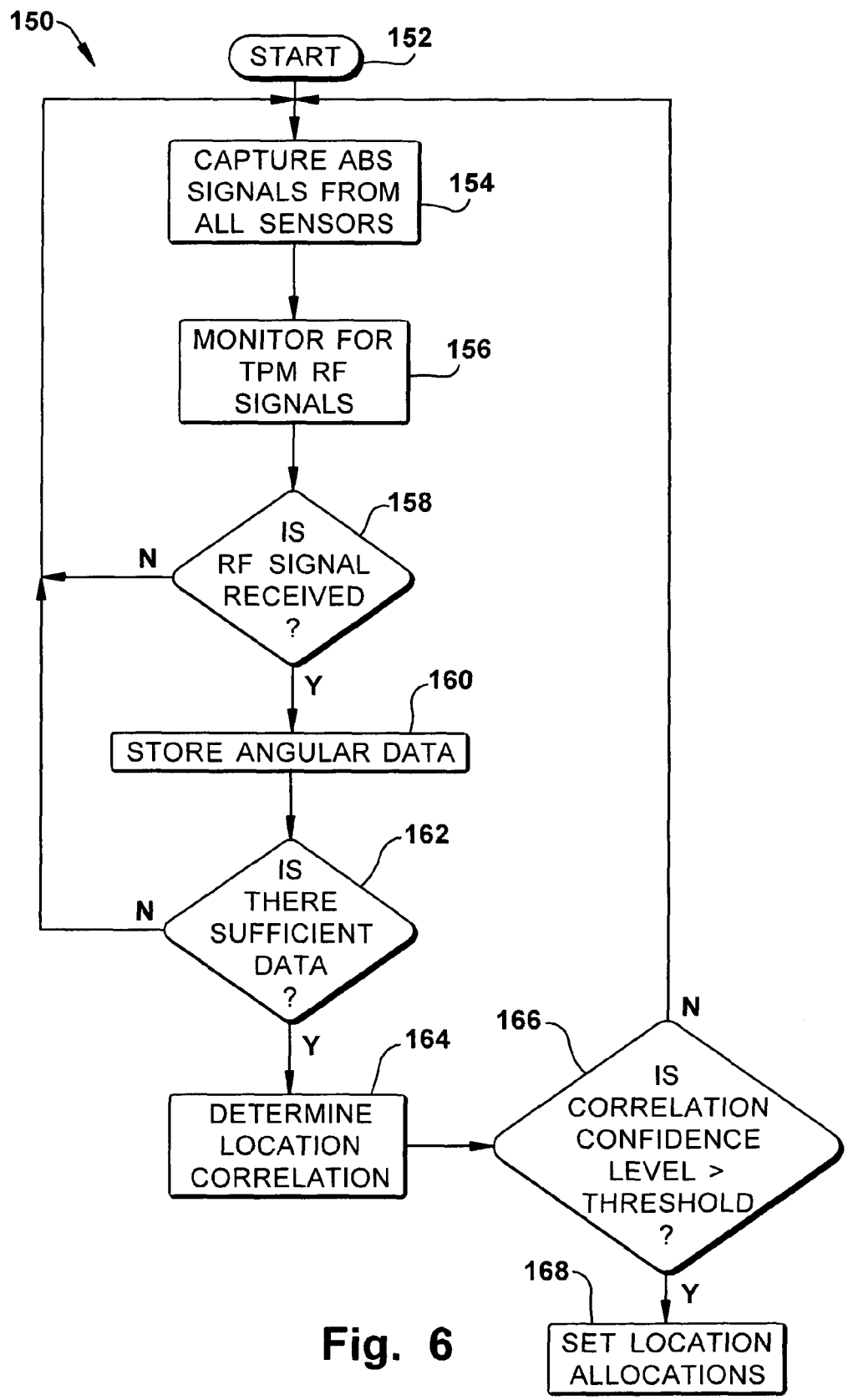
FIG. 6 is a flow chart depicting a control process in accordance with an example embodiment of the present invention to correlate each tire-based sensor location with tire location on the vehicle.

Referring to FIG. 6, a flow chart is shown depicting a control process 150 in accordance with an example embodiment of the present invention for determining tire location in a TPM system. The process starts at step 152 where initial conditions, flags, appropriate values, etc., are set. At step 154, the ABS signals indicative of the wheel angular position from each of the vehicle tires is continuously captured and provided to the receiver/controller 44. In step 156, the receiver/controller 44 monitors for received RF tire condition information signals from the tire-based units. In step 158, a determination is made whether RF signals have been received. If negative, the process loops back to step 154 where wheel angular position from the ABS wheel speed sensors is continued to be captured. If the determination in step 158 is affirmative, the wheel angles from all four wheels are temporarily stored in step 160 (table 94). In step 162, a determination is made as to whether there has been a sufficient amount of data collected to make a location determination. For example, it may be desired to have 10-20 samplings of data before a location determinations is made. If there is not enough data, the process loops back to step 154 until a sufficient amount of data is received and stored.

In step 164, a determination of wheel location is performed by correlating the angular wheel position that best corresponds to the event of the received tire condition signals, e.g., wheel FR rotates 180 degrees each time a tire condition signal having S1 ID is received therefore correlating S1 with the FR location. In step 166, a determination is made as to whether the determined tire location correlation has a confidence value greater than a predetermined value. Assuming that the confidence level of the determination is sufficient, the tire-based unit ID and determined tire location information is stored in memory in step 168. If the confidence value is not greater than a predetermined level, no location information is stored, the process loops back to step 154, and any previous stored location information is retained. The vehicle-based unit 44 correlates the sensors S1, S2, S3, and S4 with tire locations FR, FL, RR, and RL on the vehicle.

Signal filtering is required even on smooth road surfaces. Both passive and adaptive digital filtering techniques can be used to smooth the signal over the frequency range of three to twenty Hertz without undue signal attenuation or use of battery energy.

From the above description of the invention, those skilled in the art will perceive improvements, changes and modifications. For example, although the toothed disc, as described in the example embodiment, has a missing tooth to establish a zero position of the wheel, the wheel position at the time the vehicle is started can be designated the zero position, knowing that every 72 pulses (assuming a disc with 72 teeth) returns the wheel to the "zero" position (i.e., start position). Also, it is contemplated that the tire-based sensors could communicate via RF to the ABS ECU and that the ABS ECU could perform the correlation of tire-based units with vehicle corner location. Such improvements, changes, and/or modifications within the skill of the art are intended to be covered by the appended claims.

The invention claimed is:

1. An apparatus for determining a tire condition and location on a vehicle comprising:
    a tire-based sensing unit, a plurality of tires on the vehicle having an associated tire-based sensing unit, each tire-based sensing unit including,
        a first tire rotation sensor mounted for rotation with the tire and for providing a first tire rotation signal each time the tire passes one of at least two predetermined rotational position of the tire during tire rotation,
        a tire condition sensor for sensing a tire condition and for providing a tire condition signal indicative thereof and a unique tire identification indicator,
        a transmitter for transmitting the tire condition signal and the unique tire identification indicator, and
        a controller for controlling said transmitter so that the transmission of said tire condition signal and the unique tire identification indicator occurs when said first tire rotation signal indicates the tire has reached one of said at least two predetermined rotational positions during tire rotation;
    a second tire rotation sensor mounted external of the tire for sensing tire rotation and for providing a second tire rotation signal indicative of incremental angular positions of the tire relative to a reference; and
    a vehicle-based receiver for receiving said transmitted tire condition signal, the unique tire identification indicator, and said second tire rotation signal and for correlating reception of said tire condition signal with said second tire rotation signal so as to associate the unique tire identification indicator with a particular tire location on the vehicle.

2. The apparatus of claim 1 wherein said first tire rotation sensor is a gravitational sensor.

3. The apparatus of claim 1 wherein said second tire rotation sensor is a wheel speed sensor of an antilock brake system.

4. The apparatus of claim 1 further including a display device located within a cabin of the vehicle and connected to said vehicle-based receiver for displaying the received tire condition signal and associated tire position for that received tire condition signal.

5. The apparatus of claim 1 wherein said vehicle-based receiver includes a memory for storing the associated unique tire indicator with tire position.

6. The apparatus of claim 1 wherein said second tire rotation sensor includes a disc having a plurality of teeth, the disc mounted for rotation with said tire and further includes a tooth sensor mounted to the vehicle for providing a signal indicative of each disc tooth passing the tooth sensor.

7. The apparatus of claim 6 wherein said plurality of teeth are equally spaced around a circumference of the disc and one tooth is missing, said missing tooth location functioning as a reference point for said second tire rotation sensor.

8. The apparatus of claim 6 wherein said plurality of teeth are equally spaced around a circumference of the disc, the tooth location adjacent the tooth sensor at the time the vehicle is started functioning as a reference point for said second tire rotation sensor.

9. The apparatus of claim 1 wherein said at least two predetermined rotational positions are approximately 180 degrees apart.

10. The apparatus of claim 1 wherein said controller stores said received second tire rotation signals indicating the incremental angular position of the tire relative to a reference each time said transmitted tire condition signal and the unique tire identification indicator is received, the correlation of said unique tire identification indicator with a particular tire location on the vehicle using said stored second tire rotation signals indicating the incremental angular position of the tire relative to a reference.

11. A method for determining a tire condition and location on a vehicle comprising the steps of:

sensing tire rotation and providing a first tire rotation signal each time the tire passes one of at least two predetermined rotational positions during tire rotation;

sensing a tire condition and for providing a tire condition signal indicative thereof;

transmitting the tire condition signal and a unique tire identification indicator when said first tire rotation signal indicates the tire has reached one of said at least two predetermined rotational positions during tire rotation;

sensing tire rotation relative to the vehicle and providing a second tire rotation signal indicative of incremental angular positions of the tire relative to a reference;

receiving said transmitted tire condition signal, the unique tire identification indicator, and said second tire rotation signal; and correlating reception of said tire condition signal with said second tire rotation signal so as to associate the unique tire identification indicator with a particular tire location on the vehicle.

12. The method of claim 11 wherein step of sensing rotation of said tire senses gravitational forces.

13. The method of claim 11 further including the step of displaying the received tire condition signal and associated tire location for that received tire condition signal.

14. The method of claim 11 further including the step of storing the associated unique tire indicator with correlated tire location.

* * * * *